May 25, 1943.  A. V. SAMPSEL  2,319,830
LIQUID METERING DEVICE
Filed Aug. 12, 1939  4 Sheets-Sheet 1

Inventor:
Arthur V. Sampsel.
By: Frank H. Marks,
Atty.

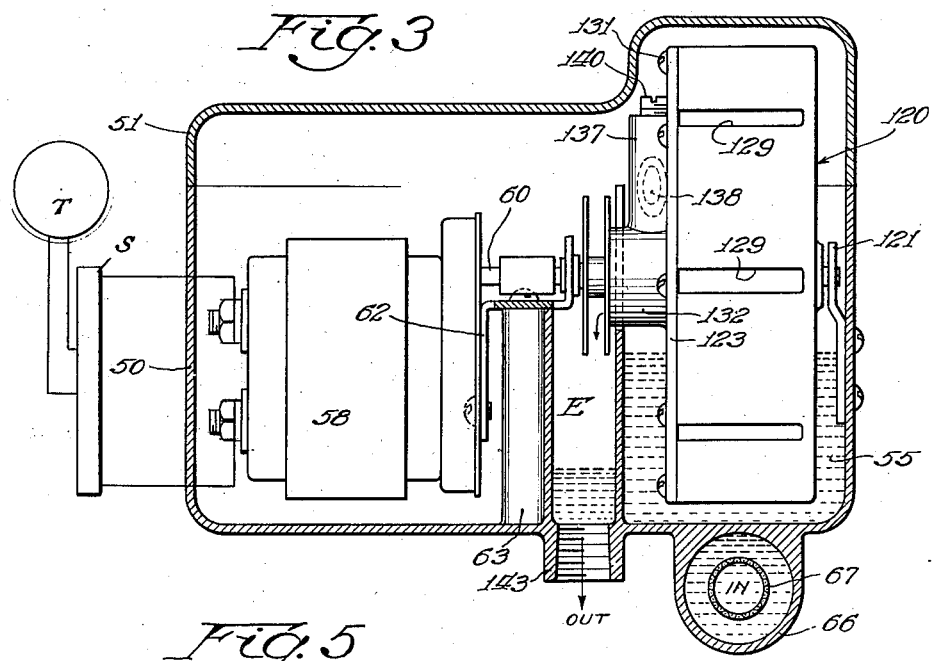

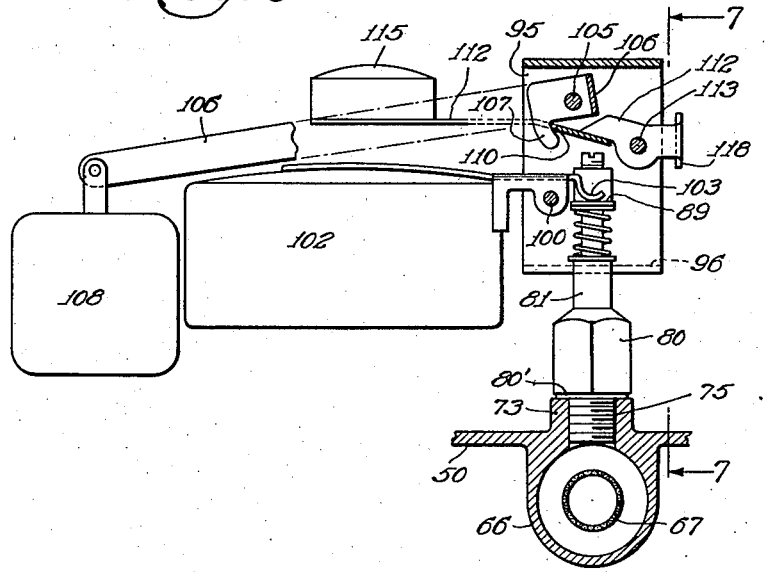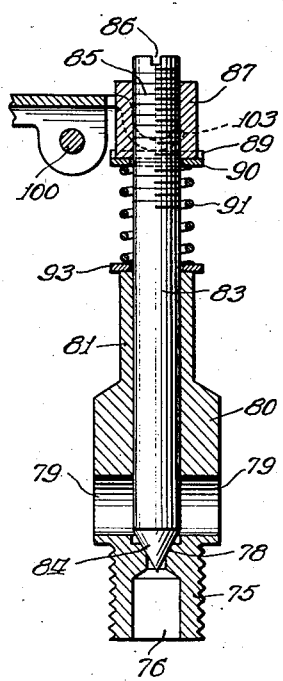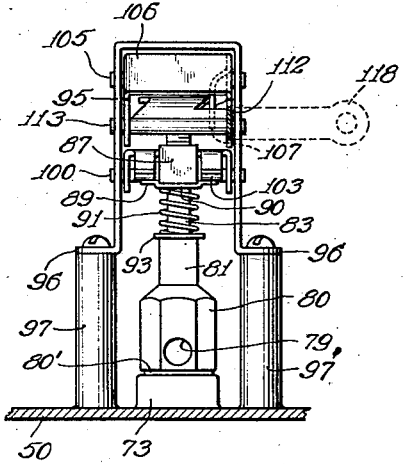

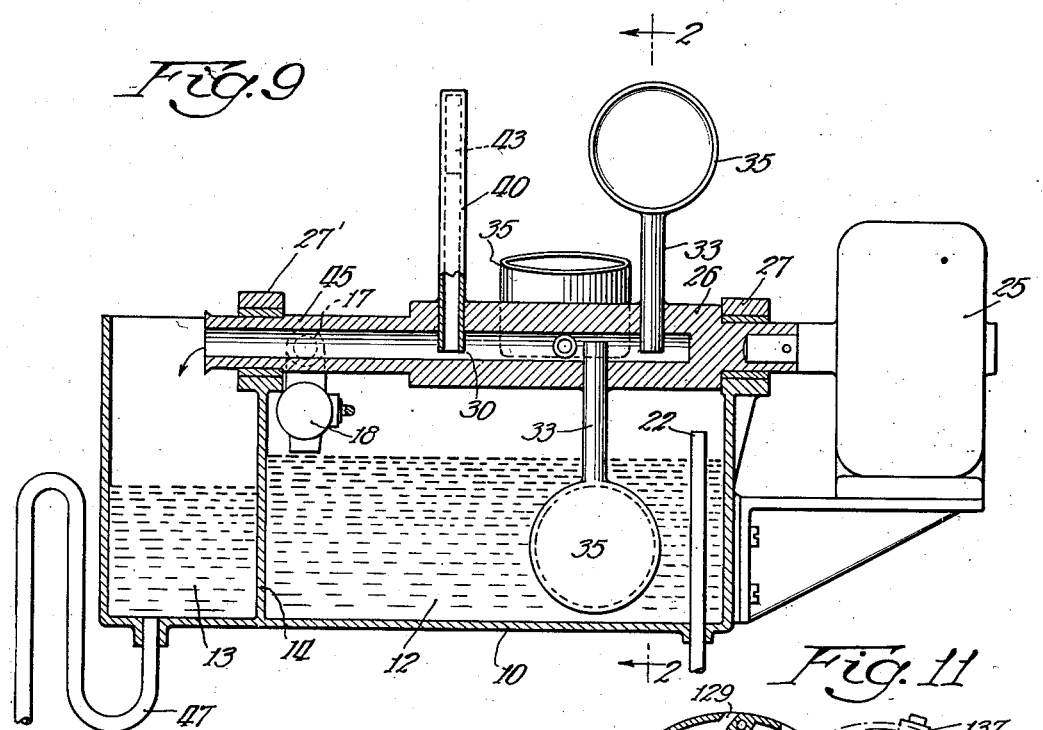
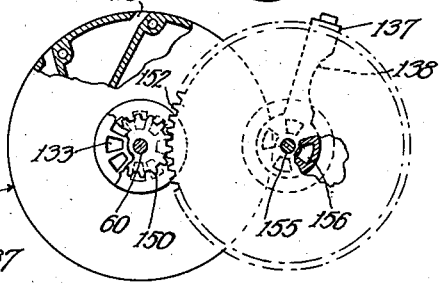
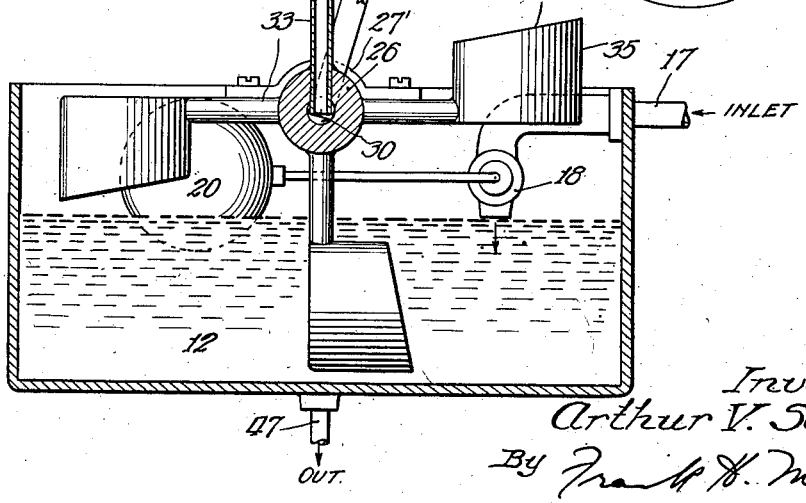

Patented May 25, 1943

2,319,830

UNITED STATES PATENT OFFICE 2,319,830

LIQUID METERING DEVICE

Arthur V. Sampsel, Mendota, Ill., assignor to Sears, Roebuck and Co., Chicago, Ill., a corporation of New York Application August 12, 1939, Serial No. 289,864

18 Claims. (Cl. 221—97)

My invention relates to liquid metering devices and has to do more particularly with an apparatus for measuring and delivering a constant flow of liquid. My invention is especially designed for delivering liquid fuel of relatively low specific gravity, such as kerosene or the like, to combustion apparatus of any suitable type.

Another object of my invention is to provide a device of the type referred to which is capable of delivering liquid at a plurality of pre-determined rates of flow in order to satisfy different requirements.

Another object is to provide such a device which will deliver a relatively large quantity of liquid or alternatively, a relatively small quantity, both at constant rate of feed, and both being adjustable. The small feed may be adapted to support a pilot flame.

A further object is to provide a device which will be adapted to maintain a constant but adjustable liquid level in the feed chamber, and will also be provided with safety means for preventing overflow.

Still another object is to provide such a device which will be simple in construction, inexpensive to fabricate, certain in operation and which will have certain safety features hereinafter to be described.

Various other objects and advantages will become apparent as the description proceeds.

According to my invention, I provide on a single shaft means for dispensing fluid at one rate of flow when the shaft rotates in one direction, with means for dispensing fluid at a different rate of flow when the shaft rotates in the opposite direction, the shaft being actuated by a reversible motor.

Referring now to the drawings forming a part of this specification and illustrating certain preferred embodiments of my invention:

Fig. 3 is a similar view taken substantially along the line 3—3 of Fig. 1.

Fig. 4 is a sectional view taken substantially along the line 4—4 of Fig. 2 and showing a liquid metering motor forming an element of the device shown in Figs. 1 to 3.

Fig. 5 is a side elevational view of said motor, partly in section, taken substantially along the line 5—5 of Fig. 4.

Fig. 6 is an elevational view of the float valve mechanism forming a part of the device shown in Figs. 1–3.

Fig. 7 is an elevational view taken substantially along the line 7—7 of Fig. 6.

Fig. 8 is a sectional-elevational detail on an enlarged scale of the valve mechanism shown in Figs. 6 and 7.

Fig. 9 is a sectional view through another form of my invention, certain parts being shown in elevation, the section being taken substantially along the line 9—9 of Fig. 10.

Fig. 10 is a transverse sectional view taken substantially along the line 10—10 of Fig. 9.

Fig. 11 is a fragmentary elevational view with parts cut away, showing another embodiment of my invention.

Figure 1:
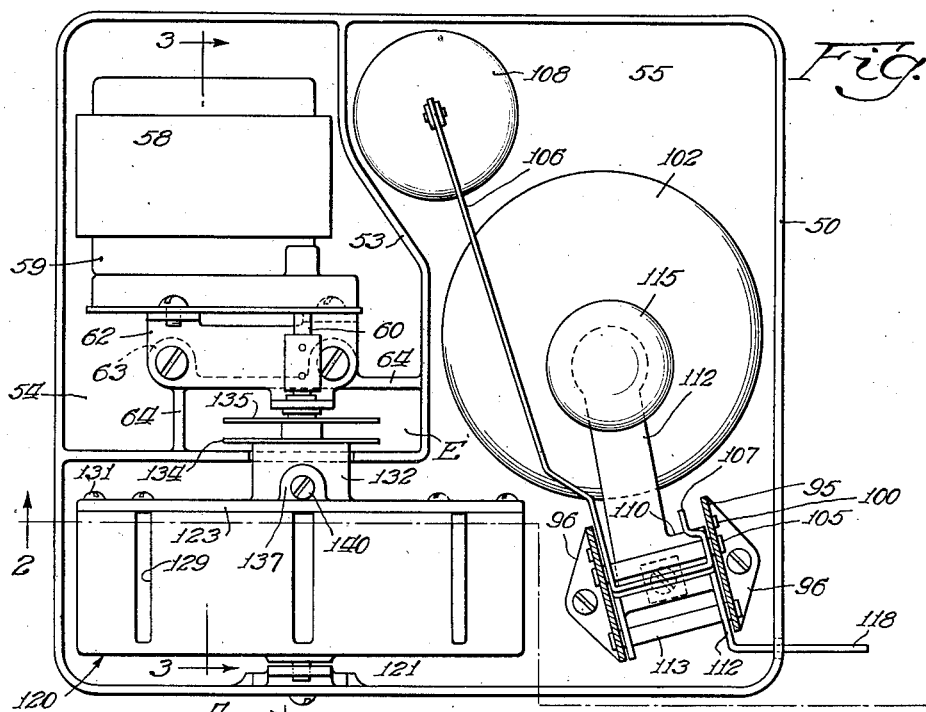
Fig. 1 is a top plan view of one form of the device embodying my invention, with the cover removed.

Referring first to Figs. 9 and 10, the numeral 10 represents a tank of any suitable design which may be divided into separate compartments 12 and 13 by means of a partition 14. If desired, separate tanks may be used. A conduit 17 communicates with any suitable source of liquid and discharges into the tank 12 through a suitable valve 18, said valve being controlled by means of a float 20. By means of the float controlled valve the liquid within the tank 12 is maintained at a substantially constant level, the valve 18 being automatically opened by the float when the liquid falls below said predetermined level and closed when the liquid rises to said level. An overflow tube 22 is provided having its inlet opening above the normal liquid level within the tank 12, so that, in the event of possible failure of the motor (to be described), or electric current, the tank 12 will not overflow.

Mounted adjacent the tank 10, as by means of a bracket 23, is a constant speed reversible motor 25 of well-known or other suitable design, said motor preferably being designed to operate at a relatively slow speed so as to avoid the necessity for reduction gearing. To the shaft of the motor is keyed a spindle 26 mounted in bearings 27 and 27', so that the spindle extends across the tank compartment 12. The spindle 26 has a longitudinal hollow bore 30, said bore being closed at one end (see Fig. 9) and at the other end being open so as to discharge into tank compartment 13. The spindle 26 is perforated at spaced points longitudinally thereof, and tubes 33 are mounted in said perforations, said tubes carrying at their extremities buckets or cups 35. The tubes 33 and buckets 35 are arranged on opposite sides of the spindle in order that the latter may be balanced. Although four buckets are shown in the preferred embodiment, it will be apparent that any number of buckets may be used so long as they are balanced around the tube so that it may constitute an even load on the motor. In any event, it is desirable, as shown, that the buckets and tubes 33 be not disposed directly opposite each other, so that liquid may not flow from one bucket into another. Furthermore, it is desirable, as shown best in Fig. 9, that the tubes 33 extend well into the bore 30 of the spindle in order that back flow of liquid from the bore to the cups may be prevented.

Inspection of Fig. 10 will show that the cups or buckets 35 preferably have a beveled edge 37 so inclined that the depth of each cup decreases from front to rear thereof, considering the outer end of the bucket as the front. By this means and by maintaining a constant level in the tank 12 so as substantially to cover the buckets when the latter are in their lowermost position, a substantially constant load of liquid is picked up by the buckets and discharged into the bore 30.

Also arranged on the spindle 26 is a tube 40 also communicating with the bore 30 of the spindle, said tube having a closed outer end 41 but having a cut away portion 43 adjacent the end thereof on a side opposite the open ends of the buckets 35, so as to provide a spoon or dipper capable of picking up a relatively small quantity of liquid when the tube 40 is submerged in the tank compartment 12 and when the spindle 26 is so rotated that the open portion 43 of spoon 40 is leading. The tube 40 and its open face 43 are of such dimensions that they will be fully submerged in the normal liquid level of said tank compartment 12 when the tube 40 is in its lowermost position, so that a constant load of liquid will be picked up thereby and discharged into the bore 30. The tube and its opening 43 are so designed in my preferred embodiment that sufficient liquid will be fed to maintain the pilot flame of a pot type burner while the size of and number of buckets 35 are so adjusted that the aggregate feed thereof will be capable of maintaining the maximum flame for such a burner. Of course, a plurality of spoons 40 may be employed if desired.

It will be understood that apparatus embodying my invention may be employed for other purposes than to feed combustion apparatus, in which case it may be desired to modify the quantity of liquid fed by the apparatus.

The spindle 26 has a reduced portion 45 which extends well into the tank compartment 13, the open end thereof being preferably flared or bell-shaped so as to inhibit any tendency of the liquid to flow back along the spindle from the discharge opening thereof, as by capillarity.

An outlet tube 47 is provided for discharging liquid from the tank compartment 13 to a burner or to any other apparatus or receptacle to which it is desired to convey a constant flow of liquid. It will be noted from Fig. 9 that a vertical goose neck is preferably provided in the discharge conduit 47 so that a constant head of liquid may be maintained at all times. This is especially desirable in connection with fuel burners, so that a steady flame may be maintained.

It is believed that the operation of the device will be apparent from the above description. When the motor 25 rotates in one direction, the buckets 35 will pick up a constant quantity of liquid which will be discharged through the bore 30 of the spindle into compartment 13, whence it will flow at a constant rate to the place desired. The motor will be reversed by suitable means when it is desired to change the quantity of liquid which is being fed from the compartment 12. Thus, where the device is being employed for heating purposes, a thermostat T (Fig. 3), arranged, for example, in the room to be heated, may, by suitable electrical connection which will be obvious to those skilled in the art, control a switch S which will reverse the motor 25. When this occurs, the spoon 40 will pick up a relatively small quantity of liquid as compared with the buckets 35, which reduced flow of liquid will be fed in the same manner through the bore 30, etc. It will be apparent that when the buckets are feeding liquid, the spoon 40 will be inoperative, and vice versa. When the device is employed for a burner, a feed by the spoon 40 of a few drops on each rotation of the spindle will ordinarily be sufficient to maintain a pilot flame. The spindle may conveniently rotate at about one R. P. M.

The device may also be employed for intermittent absorption refrigerators, in which case the large feed may be employed during the heating period of the cycle and the reduced feed to maintain a pilot during the refrigeration period. Various other applications of my invention will doubtless suggest themselves to those skilled in the art.

Referring now to Figs. 1 to 8, inclusive, showing another embodiment of my invention, the numeral 50 represents a casing which may be provided with a cover 51. Within the casing is a vertical wall 53 defining with the side wall of casing 50, an enclosure 54 within the main enclosure 55 of the casing 50.

Within the space 54 is rotatably mounted a motor 58 similar to the motor of Figs. 9 and 10, i. e. a motor which is reversible and which is adapted to rotate at a substantially constant speed. A suitable reduction gearing may be disposed within the housing 59, so that the speed of rotation finally delivered by the motor through a shaft 60 will be as desired. Said shaft is supported by a bracket 62 which may serve likewise to support the motor 58 as shown best in Fig. 3. The bracket 62 may be secured as by screws, to bosses 63 formed on an L-shaped wall 64 which defines an inclosure E.

Figure 2:
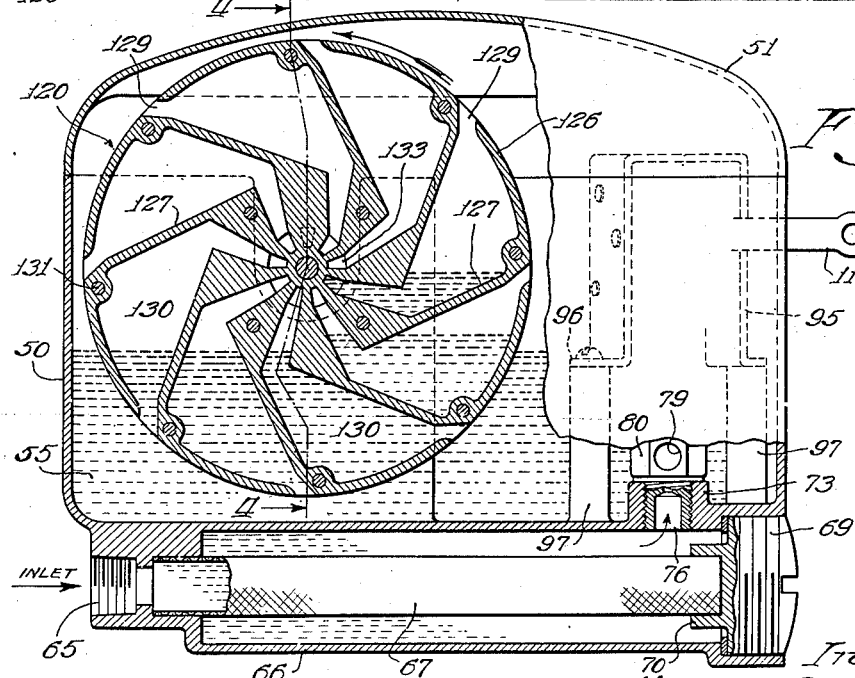
Fig. 2 is a sectional view partly in elevation, taken along the line 2—2 of Fig. 1.

In the base of the casing 50 is a threaded fitting 65 which serves as an inlet for the liquid which is to be metered, said inlet communicating with a tubular filtering chamber 66 (Fig. 2). A tubular screen 67 is disposed within the filtering chamber 66, being retained at one end in a seat formed in the fitting 65 and at the other end in a seat formed in a screw plug 69. It will be obvious that the plug 69 may be removed so that the screen 67 may be withdrawn for cleaning of whatever debris may be filtered out of the liquid.

Adjacent the end of the filtering chamber 66 opposite the inlet there extends upwardly a nipple 73 which is interiorly threaded to seat a valve shown in detail in Fig. 8. This valve comprises a nipple portion 75 exteriorly threaded to screw into the nipple 73 and provided with a bore 76. Axially aligned with the bore 76 is a valve seat 78. Adjacent the latter is a transverse passage 79 for emission of fluid into the main chamber 55, this passage being formed in an enlarged portion 80 of the valve assembly. The portion 80 has a lower flat face which, with a gasket 80', seats against nipple 75. A reduced portion 81 extends upwardly from the portion 80, the entire unit serving to journal a valve rod 83, said rod terminating in a beveled lower end 84 which is adapted to seat against the valve seat 78.

The upper end of the valve rod 83 is threaded, as indicated at 85, and a nut 87 is screwed thereon, the end of the rod being slotted as at 86 to receive a screw driver or like tool, whereby the rod 83 may be adjusted relative to the nut 87, so as to control the flow of fluid into chamber 55. Seated under the nut 87 is a yoke 89 which may be retained by a washer 90 or the like (Fig. 8), and a coil spring 91 is disposed around the valve stem 83 between the washer 90 and another washer 93.

A U-shaped bracket 95 straddles the valve assembly, this bracket having laterally extending feet 96, 96 which may be secured as by screws or the like to bosses 97, 97 attached to the floor of the enclosure 55. Pivotally secured to the bracket 95, as at 100, is a lever 101 carrying a float 102. The lever 101 has a pair of arms 103, 103, extending beyond the pivot 100 which are adapted to bear downwardly on the two sides of yoke 89.

This float 102 serves to control the inflow of liquid into the main chamber 55. It will be obvious that the valve stem 83 is normally elevated by means of the spring 91, so that the valve is open, permitting liquid to flow through the filter chamber 66 into the main reservoir 55 but that, as the liquid rises, the float 102 will cause the arm 103 to depress the valve stem against the action of the spring until the flow of liquid into reservoir 55 is entirely cut off. As liquid is withdrawn from reservoir 55, the float 102 will drop, permitting the spring 91 to open the valve, again permitting the liquid to flow into reservoir 55.

Also pivoted to the bracket 95 as at 105 is an arm 106 carrying a float 108. The arm 106 carries a dog 107 which is engageable with a lateral extension 110 on a lever 112 pivoted to the bracket 95 as at 113 and carrying at one end thereof a weight 115. At the other end of the weighted lever 112 is a manipulating member 118 which extends through the casing 50 as seen best in Fig. 1.

The function of the parts just described is to prevent overflow of the reservoir 55. The float 108 and the weight 115 and their associated parts are normally arranged as seen in Fig. 6, with the weight retained in elevated position by dog 107. Should the liquid level rise in reservoir 55 beyond a predetermined level of safety, the float 108, in rising to that level, will carry with it the dog 107, which will become disengaged from the projection 110, allowing the weight 115 to drop by gravity, carrying the lever 112 to a point where it will bear against the upper end of the valve rod, depressing it against the resistance of the spring 91 so that the valve will be closed. It will be apparent, of course, that, after such shutoff has occurred, the parts may be restored to normal position by raising the weight 115, which may be accomplished by depressing the manipulating member 118, and permitting the float 108 to drop by withdrawal of liquid to the normal level.

Rotatably carried by the shaft 60 within the reservoir 55 is a metering rotor 120, a thrust bearing 121 preferably being provided. This rotor comprises a pair of spaced discs 123 and 124. Arranged between the two discs is a plurality of scoops formed by spaced peripheral members 126 and inwardly extending members 127. The members 127 extend between the peripheral members 126 and the hub of the rotor. The spaces 129 between the peripheral members define opening passages for the buckets or scoops 130. Although the rotor may be formed in various ways, I have found it convenient to form the parts 126, 127 integral with the disc 124 and secure this integral part to the disc 123 as by means of screws 131.

The disc 123 may have formed integrally with it a hub portion 132 having channels 133 therein communicating with the scoops 130. The hub portion 132 is provided with a flange 134 and a similar flange 135 is also provided integrally with the hub portion 132 in spaced relation to the flange 134. Although I have shown a discharge channel 133 for each scoop 130, there may, of course, be one or more common channels.

Also formed on the rotor 120 is a radially extending tube 137 having an opening 138 formed on one side thereof. A screw 140 is threaded into said tube 137 and is adapted to close the opening 138 to varying degrees.

An outlet 143 is provided below the chamber E whereby the metered liquid may be drawn off to any desired point.

It is believed that the operation of the device shown in Figs. 1–8, inclusive, and just described, will be readily understood. Liquid is fed in through the filter chamber 66 and thence through the valve assembly into reservoir 55, the liquid level in said reservoir being automatically maintained by means of the floats, as described above. From the chamber 55 liquid will be delivered by the rotor at a constant rate into the chamber E. When the rotor is rotated in a counterclockwise direction (Fig. 2), a large feed of liquid will be maintained. The amount of liquid fed may, of course, be varied by adjustment of the liquid level within the reservoir 55, and this may be controlled by adjustment of the valve stem 83, which is threaded for that purpose. When the rotor is revolved in a clockwise direction by reversal of the motor, the scoops 130 will then be inoperative and the tubular feed member 137, which is inoperative when the rotor is revolving counterclockwise, will then operate to provide a relatively small feed. The small feed, of course, may be varied by adjustment of the screw 140. In either event, whether the feed is large or small, it will be at a constant rate.

It will be understood that the reversal of the motor may be controlled by means of a thermostate (not shown), which thermostat may be disposed wherever desired, depending upon the use to which my apparatus is to be applied. Thus, for example, when my invention is to be applied to heating or air conditioning apparatus, the thermostat will be disposed in a room which is to be heated or air conditioned. In other cases, where my invention is to be applied to refrigerating apparatus, the thermostatic control may be disposed in the refrigerator or in certain working parts thereof or in the room, where an ambient control is to be provided. Other applications of my invention will doubtless suggest themselves to those skilled in the art.

In certain cases I have found that the relatively small feed member shown in the embodiments described above will deliver material at a rate in excess of certain requirements. This may be true where a pilot flame of a burner consumes a very small quantity of fuel. Fig. 11 shows an arrangement whereby material may be delivered by the small feed element at a very low rate. This is accomplished by the introduction of gears or other speed reducing elements.

In Fig. 11, the rotor 120 is substantially as shown in Figs. 1–5 except that it does not carry a relatively small feed element as shown in said figures. On the shaft 60 which, as in the other embodiment, is provided with one or more longitudinal passage ways 133, there is a spur gear 150 which meshes with a similar gear 152 carried by a shaft 155 arranged parallel to the shaft 60. The shaft 155 is also provided with a longitudinal passage way 156 and communicating with this passage is a pickup or feed member 137 which may be similar to the feed member shown in Figs. 3-5. Instead of gearing, I may use sprockets and chain, pulleys and belting, or equivalent motion transmission means.

It will be obvious from Fig. 11, since the shaft 155 will be caused to rotate at a much lower speed than the shaft 60, that the relatively small pickup will have a greatly reduced capacity for delivering material as compared with the device of Figs. 3-5. As in the other embodiments, the small pickup of Fig. 11 will be operative only when the large pickup is inoperative, and vice versa. In other words, when the shaft 60 is rotating clockwise so as to be operative, the shaft 155 will be rotating counterclockwise so as to be inoperative.

In a preferred embodiment, the shaft 60 may rotate at a constant speed of about 10 R. P. M. while the shaft 155 is geared to rotate at approximately 3 R. P. M. These figures are merely illustrative, of course, as the speed will depend on the size of the parts.

Various modifications may suggest themselves to those skilled in the art without departing from the spirit of my invention, and, hence, I do not wish to be restricted to the specific form shown or uses mentioned except to the extent indicated in the appended claims, which are to be interpreted as broadly as the state of the art will permit.

I claim:

1. A liquid metering device comprising a hollow shaft, means for rotating said shaft in opposite directions, and feed members mounted on said shaft and communicating with the bore thereof, certain of said feed members being of different capacities and having their intake openings disposed in opposite directions whereby, when said shaft is rotated in opposite directions, different quantities of material will be fed.

2. A liquid metering device comprising a receptacle, a hollow shaft, and a feed member carried by said shaft and adapted to pick up liquid from said receptacle and discharge it into the bore of said shaft, said feed member comprising a hollow tube having its end closed by a member threaded therein and having an opening on the side thereof in the direction of normal operative rotation of said feed member, said opening being regulable by adjustment of said threaded member, and reversible means for rotating said shaft at a constant speed.

3. In combination with a device as defined in claim 1, wherein said rotating means is a reversible constant speed electrical motor, means for reversing said motor, and heat responsive means for actuating said reversing means.

4. A liquid metering rotor comprising a rotatable shaft, a relatively large container carried by said shaft and having an opening toward one direction of rotation of said shaft, and a relatively small container carried by said shaft and having an opening toward the opposite direction of rotation of said shaft, both of said containers discharging through a passage in said shaft, and means for adjusting the size of the opening in said smaller container.

5. A liquid metering device comprising a receptacle, a plurality of hollow shafts, scoops carried by said shafts and communicating therewith, whereby material picked up by said scoops will be discharged through said shafts, the scoops of the respective shafts being of different capacities, said shafts being interconnected for rotation in opposite directions, the scoops of each shaft being operative only when rotated in one direction, and the scoops of one shaft being inoperative when those of the other shaft are operative.

6. A liquid metering device comprising a receptacle, a plurality of hollow shafts, scoops carried by said shafts and communicating therewith, whereby material picked up by said scoops will be discharged through said shafts, the material fed through the respective shafts flowing at different rates, said shafts being arranged for rotation in the same direction, but the scoops on one shaft being operative only when rotated in one direction while those of the other shaft are operative only when rotated in the other direction, means for rotating the shafts at different relative speeds, and means for reversing direction of rotation of said shafts.

7. A liquid metering device comprising a receptacle, a plurality of hollow shafts, scoops carried by said shafts and communicating therewith, whereby material picked up by said scoops will be discharged through said shafts, the material fed through the respective shafts flowing at different rates, said shafts being geared for rotation in the same direction but at different relative speeds, the scoops on one shaft being operative only when rotated in one direction while those of the other shaft are operative only when rotated in the other direction, and reversible means for rotating said shafts.

8. A liquid metering device comprising a receptacle, a hollow shaft, a feed member carried by said shaft and adapted to pick up liquid from said receptacle and discharge it into the bore of said shaft, said feed member comprising a hollow tube having an opening on one side in a direction of rotation of said feed member, means for adjustably restricting said opening, and reversible means for rotating said shaft at a constant speed.

9. A liquid metering device comprising a receptacle, a plurality of hollow shafts, reversible constant speed means for driving one of said shafts, means interconnecting said last mentioned shaft with the other shaft whereby said other shaft will be driven in the opposite direction and at a substantially different speed, scoops carried by said shafts and communicating therewith whereby material picked up by said scoops will be discharged through said shafts, the scoops of each shaft being operative only when rotated in one direction, and the scoops of one shaft being inoperative when those of the other shaft are operative.

10. A liquid metering rotor comprising a hub having an axial passage therethrough and a plurality of buckets carried on said hub and communicating with said passage, said buckets comprising a pair of spaced plates forming the side walls of said buckets, a plurality of spaced peripheral members, the spaces therebetween forming openings for said buckets, a plurality of members extending between said plates and from said peripheral members to said hub, said last mentioned members being non-radial and so shaped that the buckets will be operative to scoop up material only when rotated in one direction and inoperative when rotated in the opposite direction, and a container of relatively small capacity also carried on said hub and adapted to pick up material only when said buckets are inoperative.

11. A liquid metering rotor comprising a hub having an axial passage therethrough and a plurality of buckets carried on said hub and communicating with said passage, said buckets comprising a pair of spaced plates forming the side walls of said buckets, a plurality of spaced peripheral members, the spaces therebetween forming openings for said buckets, a plurality of members extending between said plates and from said peripheral members to said hub, said last mentioned members being non-radial and so shaped that the buckets will be operative to scoop up material only when rotated in one direction and inoperative when rotated in the opposite direction, a container of relatively small capacity also carried on said hub and adapted to pick up material only when said buckets are inoperative, and means for adjusting the capacity of said smaller container.

12. A liquid metering device, comprising a receptacle, a hollow shaft, a feed rotor communicating with and carried by said shaft, said rotor being designed to feed liquid at a given rate in one direction of rotation and at a different rate in the reverse direction, and means for rotating said shaft in both directions at substantially constant speed.

13. A liquid metering device, comprising a receptacle, a hollow shaft, a feed rotor communicating with and carried by said shaft, said rotor being designed to feed liquid at a given rate in one direction of rotation and at a different rate in the reverse direction, means for rotating said shaft in both directions at substantially constant speed, and means for maintaining a substantially constant liquid level within said receptacle.

14. A liquid metering device, comprising a receptacle, a hollow shaft, a feed rotor communicating with and carried by said shaft, said rotor being designed to feed liquid at a given rate in one direction of rotation and at a different rate in the reverse direction, reversible means for rotating said shaft at substantially constant speed, means for maintaining a substantially constant liquid level within said receptacle, means for reversing the rotating means, and heat responsive means for actuating said reversing means.

15. A liquid metering device comprising a receptacle, a hollow shaft, a feed member carried by said shaft and communicating therewith, said feed member comprising a hollow tube having an opening with an adjustable closure for varying the feed, and means for rotating said shaft at constant speed.

16. A liquid metering device comprising a hollow shaft, a scoop carried by said shaft and communicating therewith, a synchronous motor operatively connected to said shaft, whereby the latter may be rotated at a substantially fixed speed at all times, a receptacle wherein said scoop rotates, means for introducing liquid into said receptacle, and means for maintaining a substantially constant liquid level within said receptacle comprising a float valve controlling the inflow of liquid and means for preventing overflow beyond said constant level, all of which elements in combination providing a substantially uniform rate of liquid feed from said receptacle.

17. A liquid metering device comprising a hollow shaft, means for rotating said shaft in opposite directions, and a chambered rotor carried by said shaft, the chambers having inlets through which liquid is picked up in either direction of rotation, the chambers communicating with the bore of the shaft, all being so constructed and arranged that when said shaft is rotated in opposite directions different quantities of material will be fed.

18. A liquid metering device comprising a hollow shaft, a synchronous electric motor for rotating said shaft in opposite directions, and a chambered rotor carried by said shaft, the chambers having inlets through which liquid is picked up in either direction of rotation, the chambers communicating with the bore of the shaft, all being so constructed and arranged that when said shaft is rotated in opposite directions different quantities of material will be fed.

ARTHUR V. SAMPSEL.